United States Patent
Taguchi et al.

[11] Patent Number: 5,709,403
[45] Date of Patent: Jan. 20, 1998

[54] AIRBAG DEVICE PROVIDED WITH AIRBAGS LOCATED ON DRIVER'S SEAT SIDE AND PASSENGER'S SEAT SIDE

[75] Inventors: Masahiro Taguchi, Hazu-gun; Kazutaka Katoh, Okazaki; Masatada Yoshida, Ichinomiya; Masayasu Kato, Nagoya, all of Japan

[73] Assignee: Nippondenso Co., Ltd., Kariya, Japan

[21] Appl. No.: 485,555

[22] Filed: May 3, 1995

[30] Foreign Application Priority Data

May 18, 1994 [JP] Japan .................................. 6-103919

[51] Int. Cl.⁶ .................................................. B60R 21/32
[52] U.S. Cl. ........................ 280/735; 280/728.2; 280/732
[58] Field of Search ................................... 280/735, 734, 280/732, 728.1, 728.2, 730.1

[56] References Cited

U.S. PATENT DOCUMENTS

| | | | |
|---|---|---|---|
| 5,187,465 | 2/1993 | Stonerook et al. | |
| 5,280,950 | 1/1994 | Mori | 280/734 |
| 5,311,065 | 5/1994 | Kondo . | |
| 5,314,341 | 5/1994 | Kazita et al. . | |
| 5,505,483 | 4/1996 | Taguchi et al. | 280/728.2 |

FOREIGN PATENT DOCUMENTS

| | | | |
|---|---|---|---|
| 2-310143 | 12/1990 | Japan | 280/735 |
| 4-129860 | 4/1992 | Japan | 280/734 |
| 5-646 | 1/1993 | Japan | 280/728.2 |
| WO94/10009 | 5/1994 | WIPO | 280/728.2 |

*Primary Examiner*—Eric D. Culbreth
*Attorney, Agent, or Firm*—Cushman, Darby & Cushman IP Group of Pillsbury Madison & Sutro LLP

[57] ABSTRACT

An airbag device which includes a passenger seat airbag module and driver's seat airbag module, detects a vehicle collision by means of an electronic control unit (ECU) thereof and inflates the airbags upon the vehicle collision. In the airbag device, the ECU and passenger seat airbag module are formed as a single unit which is installed in the passenger seat dashboard.

24 Claims, 5 Drawing Sheets

AIRBAG DEVICE PROVIDED WITH AIRBAGS LOCATED ON DRIVER'S SEAT SIDE AND PASSENGER'S SEAT SIDE

CROSS REFERENCE TO RELATED APPLICATION

This application is based upon and claims priority from Japanese Patent Application No. Hei 6-103919 filed May 18, 1994, the contents of which are included herein.

BACKGROUND OF THE INVENTION

1. Field of the Invention

The present invention relates to an airbag device containing airbags which expand upon collision of a vehicle to soften shock to the passengers, and which are located on the driver's seat side and passenger seat side of the vehicle.

2. Related Art

An airbag device are traditionally known which include airbag modules on the driver's seat and passenger seat sides of the vehicle to protect passengers.

Such an airbag device comprises an airbag module for the driver's seat, an airbag module for the passenger seat, an electronic control unit to determine a vehicle collision, a power source to supply electric power to the airbag modules and electronic control unit, and wiring for giving electrical connections between the airbag modules, electronic control unit and power source. Each of the airbag modules comprise an airbag which expands to protect passenger from shock upon the vehicle collision, an inflator to generate gas in order to unfold the airbags, and a case to house the airbag and inflator respectively.

An example of the airbag device of such a construction is illustrated in FIG. 8. In the airbag device 102 as shown in FIG. 8, an electronic control unit 115 is disposed on a compartment floor of the vehicle. Electric power is supplied from a power source 112 via a wire harness 111 to the electronic control unit 115 disposed on a compartment floor. The electronic control unit 115 monitors an occurrence of breakdown due to electrical breakage, etc. in front airbag sensors 113, 114 and airbag modules 110, 120. When the electronic control unit 115 detects the occurrence of the breakdown, a warning lamp 117 attached to a meter panel 116 is lighted. Signals from multiple front airbag sensors 113, 114 and an acceleration sensor (not illustrated) built in the electronic control unit 115 are used to detect a vehicle collision. When the electronic control unit 115 detects the vehicle collision based on the signals from sensors 113, 114, and the acceleration sensor, it supplies a starting current to inflators (not illustrated) installed in the passenger seat airbag module 110 and the driver's seat airbag module 120. The inflators are electrically connected to the electronic control unit 115 by means of the wire harness 111. Also, because the driver's seat airbag module 120 is attached to a steering unit 118, a connector device 121 is used for securing an electrical connection between the driver's seat airbag module 120 and the electronic control unit 115. The connector device 121 includes a flexible cable 119 wound loosely. When a steering wheel (not illustrated) rotates, the loose winding of the flexible cable absorbs the rotation of the steering wheel. The connector device 121 is disclosed in, for example, Japanese Unexamined Patent Publication No. Hei 5-198340 which is equivalent to U.S. Pat. No. 5,314,341.

However, as shown in FIG. 8, because the electronic control unit 115 is disposed on the compartment floor, a greater amount of the wire harness 111 which electrically connects with the above components is required. Also, because of attaching the electronic control unit 115, the passenger seat airbag module 110 and the driver's seat airbag module 120 separately to the vehicle, there is the problem that the airbag device 102 is unsuitable in terms of attachment operations.

SUMMARY OF THE INVENTION

It is an object of the present invention to provide an airbag device that can easily attache the airbag device to the vehicle and simplify wiring of wire harness in the airbag device.

It is another object of the present invention to provide an airbag device that need not use a lot of wiring channels of the flexible cable of the connector device connecting electrically the components in the steering rotation section with the components disposed in the other locations.

An airbag device according to the present invention comprises an electronic control unit to determine a vehicle collision and output a collision signal in case the vehicle collision is determined, a passenger seat airbag module including a first inflator to generate gas based on the collision signal from the electronic control unit, a first airbag inflated due to the gas from the first inflator at the passenger seat side and a first case housing the first inflator and first airbag, a driver's seat airbag module including a second inflator to generate gas based on the collision signal from the electronic control unit, a second airbag inflated due to the gas from the second inflator at the driver's seat side, and a second case housing the second inflator and second airbag, at least one power source supplying electric power to the electronic control unit and to the first and second inflators, and wiring for giving electrical connection between the electronic control unit and the first and second inflators, the electronic control unit and said passenger seat airbag module being composed as a single unit.

As described above, the passenger seat airbag module and electronic control unit are composed as a single unit. For realizing the construction, it is acceptable to attach the electronic control unit to the first case. As a result, no time is required to independently attach the electronic control unit to the vehicle and it is thus easier to install the airbag device in the vehicle. In addition, compared to conventional devices, each space between the electronic control unit and the passenger seat airbag module, the driver's seat airbag module and the power source is closer, thus making it possible to reduce the necessary amount of wiring to electrically connect those components. In addition, on the passenger seat side of the vehicle, the passenger seat airbag module and the electronic control unit are composed as a single unit, so it is possible to reduce the number of wires to the driver's seat airbag module that is usually attached to the steering unit.

BRIEF DESCRIPTION OF THE DRAWINGS

Other features and advantages of the present invention will be appreciated, as well as methods of operation and the function of the related parts, from a study of the following detailed description, the appended claims and the drawings, all of which form a part of this application. In the drawings:

DETAILED DESCRIPTION OF THE PREFERRED EMBODIMENTS

Next follows a description of the first embodiment of the present invention with reference to the attached figures.

Figure 1:
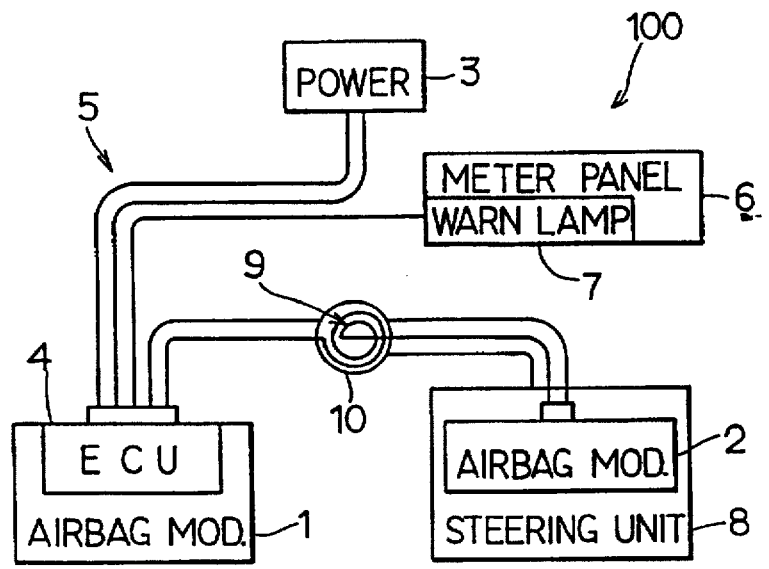
FIG. 1 is a schematic block diagram showing the entire structure of the invention.

FIG. 1 shows the entire structure when attaching an airbag device 100 according to the present invention to a vehicle. As shown in FIG. 1, the airbag device 100 comprises a power source 3 mounted in the vehicle and supplying an electrical power to each component of the airbag device 100, a passenger seat airbag module 1, a driver's seat airbag module 2, etc. The passenger seat airbag module 1 comprises an airbag that inflates to protect passenger upon a vehicle collision, an inflator that generates gas to inflate the airbag and a housing that houses the airbag and inflator. The passenger seat airbag module 1 is installed in a dashboard in front of the passenger seat in the vehicle. An electronic control unit (ECU) 4 which controls a starting of the inflator in the passenger seat airbag module 1 is composed as a single unit with the passenger seat airbag module 1. The structure will be described later in detail with reference to FIG. 2. The ECU 4 is supplied the electrical power from the power source 3 by means of a wire harness 5 connecting them electrically.

The ECU 4 determines the vehicle collision based on a signals from a front sensor (not illustrated) and an acceleration sensor installed in ECU 4 to detect the vehicle collision. The ECU 4 also monitors an occurrence of a breakdown or a short-circuiting in a current source circuits or the like of the sensors and inflators, and the wire harness 5 transmits a abnormal signal from the ECU 4 to a warning lamp 7 formed on a meter panel 6. When the warning lamp 7 receives the abnormal signal the warning lamp 7 lights up to warn passengers about the occurrence of the abnormality.

The driver's seat airbag module 2 is installed in a steering unit 8 in order to protect the driver on the driver's seat of the vehicle in case of the vehicle collision. As is the case on the passenger seat, the driver's seat airbag module 2 comprises an airbag, an inflator and a housing to house these.

Figure 7:
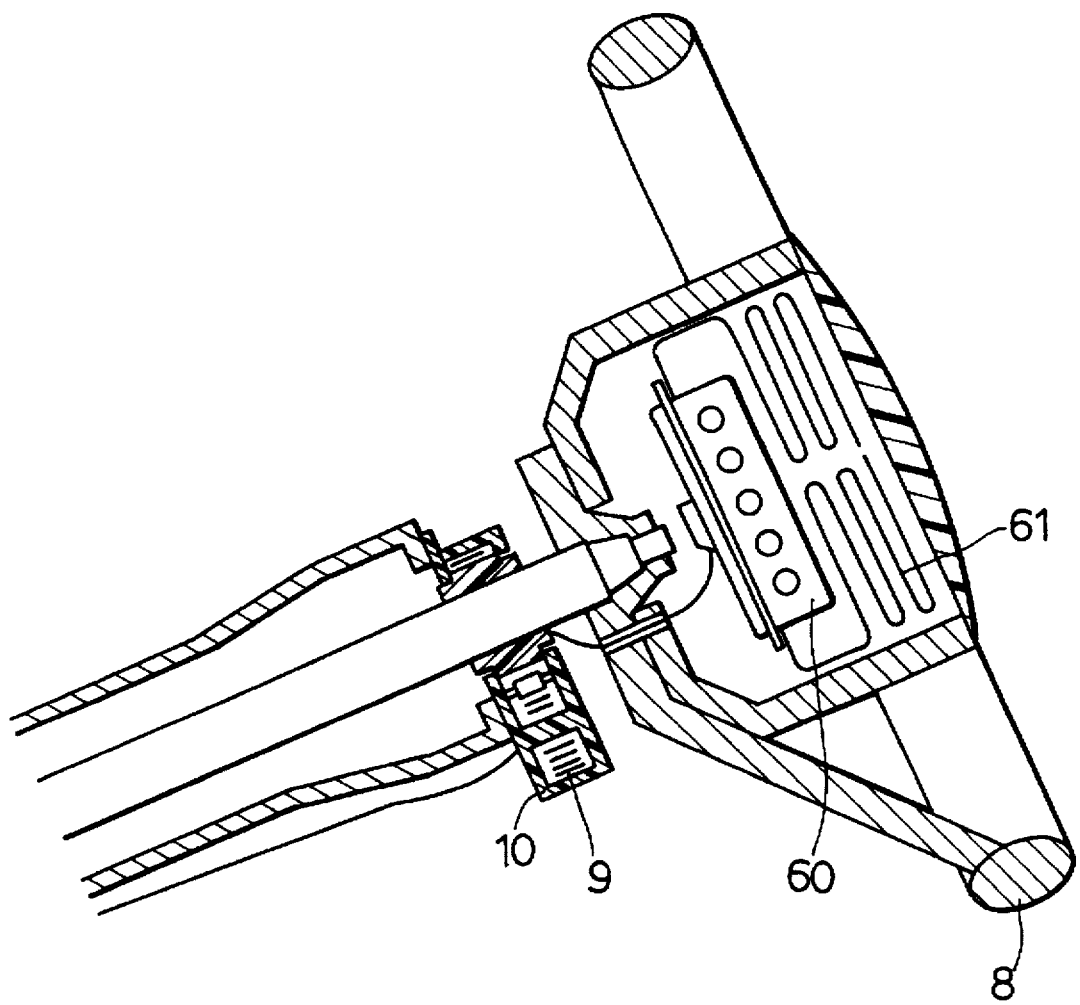
FIG. 7 is a cross section plan view showing the driver's seat airbag module attached to the steering unit.
Figure 8:
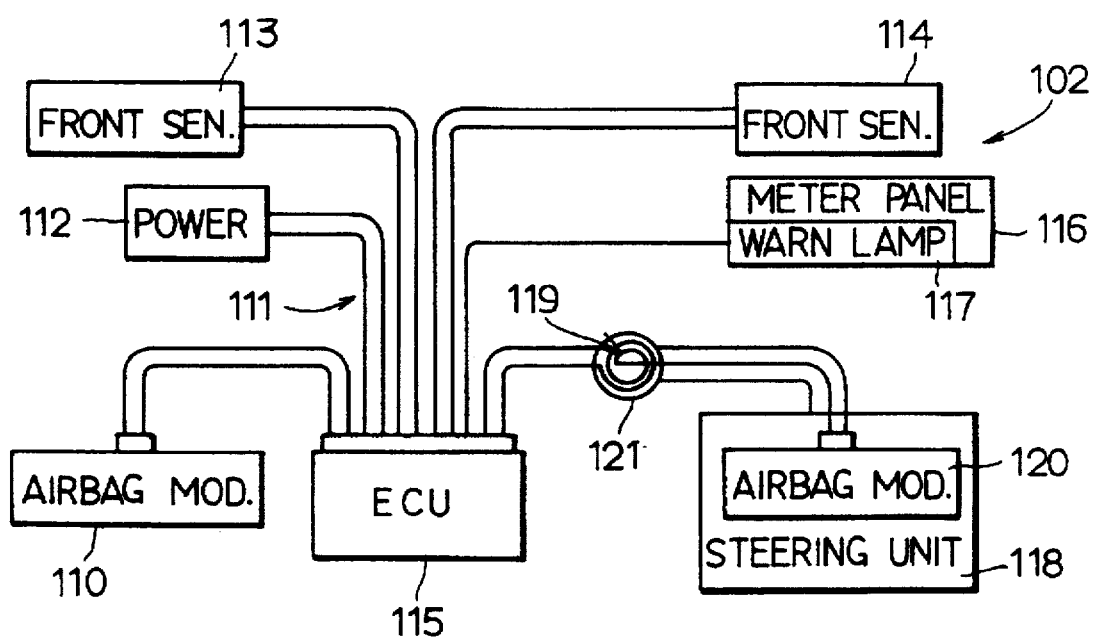
FIG. 8 is a schematic block diagram showing an entire structure of a conventional airbag device.

FIG. 7 shows an example of how the driver's seat airbag module 2 is attached to the steering unit 8. Included on the driver's seat airbag module 2 attached to the steering unit 8 are the airbag 61 and inflator 60. In consideration of the attachment space of the steering unit 8, it is common practice to use a disc-shaped inflator 60. The wire harness 5 to transmit the electrical power from the power source 3 to the inflator 60 via the ECU 4 is connected to a connector 10. Provided in the connector 10 is a spiral cable 9 containing the necessary wiring channels. The spiral cable 9 is electrically connected to the inflator 60 to supply the electrical power.

The following is a description of the operation and effects of the airbag device 100 with such a structure.

If the ECU 4 determines the vehicle collision based on signals from the front sensor and the acceleration sensor built in the ECU 4, the airbags in the passenger seat airbag module 1 and the driver's seat airbag module 2 inflate to protect passengers from the shock of the vehicle collision.

In this airbag device 100, the ECU 4 is housed in the dashboard of the passenger seat side together with the passenger seat airbag module 1. As a result, compared to conventional structures where the ECU 4 is attached at a position (e.g., the vehicle floor) away from the power source 3, the airbag modules 1, 2 and the meter panel 6, it is possible to reduce the total distance of the wire harness 5 electrically connecting above components. And because the ECU 4 is attached together with the passenger seat airbag module 1 at a static state inside the dashboard of the passenger seat side instead of the rotating steering unit 8, it is possible to reduce the number of wiring channels in the spiral cable 9 occupied by the airbag device 100, thus allowing the smaller configurations of the spiral cable 9 and connector 10. If it is possible to reduce the number of wiring channels in the spiral cable occupied by the airbag device 100, it is easier to utilize the wiring channels for other functions such as car-telephone switches, and improve comfort in the vehicle, which is one important theme with regard to the vehicle in recent years.

Next follow descriptions of the structure where the passenger seat airbag module 1 and ECU 4 are formed as a single unit, and of the structure where the passenger seat airbag module 1 and ECU 4 formed as a single unit are installed in the passenger seat dashboard of the vehicle.

Figure 2:
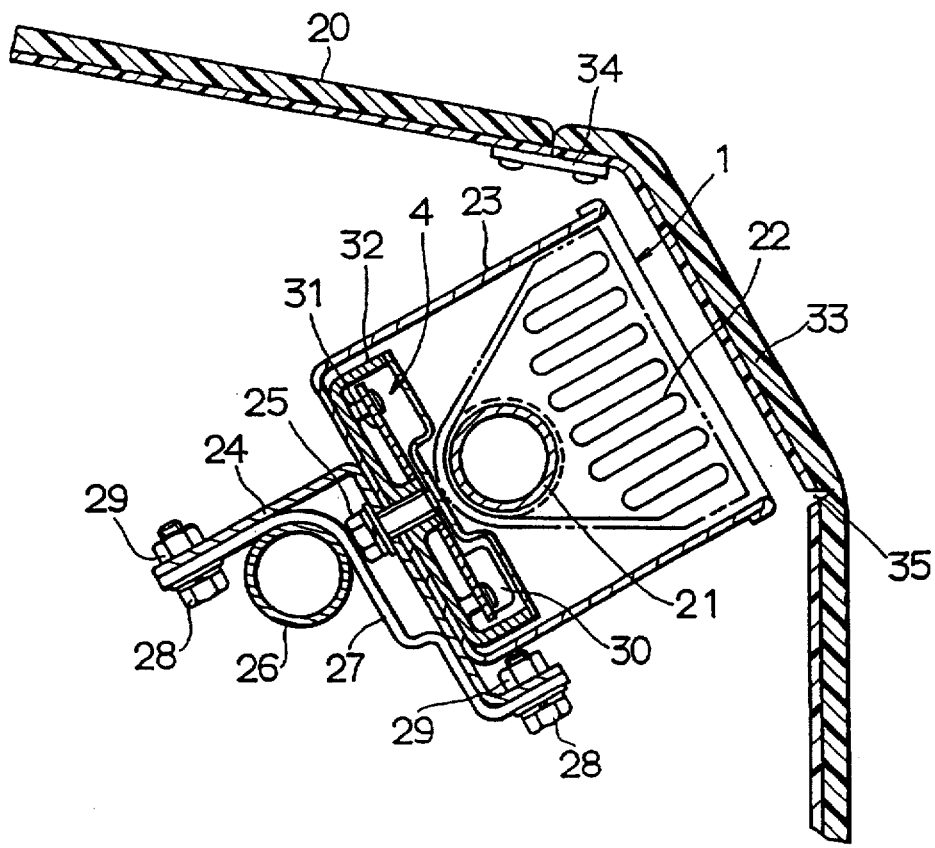
FIG. 2 is a cross section plan view showing the first embodiment in which the passenger seat airbag module 1 and ECU 4 are formed and attached as a single unit in a dashboard 20 of the passenger seat side.

FIG. 2 is a cross section plan view showing the first embodiment in which the passenger seat airbag module 1 and ECU 4 are installed as a single unit in the passenger seat dashboard 20 of the vehicle. The inflator 21 and airbag 22 comprising the passenger seat airbag module 1 are housed in the housing 23 and secured to one section of the housing 23. Also housed and secured in the housing 23 is the ECU 4. The ECU 4 is bolted with the bolt 25 together with a housing 23 to a stay 24 to which multiple nuts 29 are welded. On a printed circuit board (PCB) 31 of the ECU 4, an acceleration sensor 30 to be described later is disposed. A collision determining circuit (not shown in the figure) and a fault diagnosis circuit (not shown in the figure) are also on PCB 31. They are housed in a case 32. A dashboard reinforcement 26 is secured to a front pillar section (not shown in the figure). An attachment stay 27 is welded to the dashboard reinforcement 26. It is also possible to secure the attachment stay 27 with screws instead of welding. The passenger seat airbag module 1 is secured to the attachment stay 27 by means of multiple bolts 28 via the stay 24.

Next follows a description of the operation of the passenger seat airbag module 1 and ECU 4 installed in the passenger seat dashboard 20 as described above.

Deceleration (negative acceleration) generated in the vehicle upon the vehicle collision is transmitted to the dashboard reinforcement 26 via a chassis frame and front pillar section of the vehicle. Furthermore, the deceleration (negative acceleration) is transmitted from the dashboard reinforcement 26 to the ECU 4 installed in the housing 23 via the attachment stay 27 and the stay 24. Also included in the ECU 4 is an acceleration sensor 30 to detect the deceleration (negative acceleration) and output a detection signal. Based on at least the detection signal output from the acceleration sensor 30, it is determined by the collision determining circuit whether the vehicle collision has occurred. If so, an ignition signal is output from the collision determining circuit to ignite the inflator 21. According to the ignition signal, a starting current is supplied from a power source (not shown in the figure) to the inflator 21 to generate the gas to inflate the airbag 22. When the airbag 22 inflates upon receiving the gas, the airbag 22 presses against an opening lid 33 formed in the passenger seat dashboard 20. At this time, the lip line 35 breaks owing to the pressure from the airbag 22. Because a hinge section 34 supports the opening lid 33, in response to the breaking of the lip line 35, the opening lid 33 bends at hinge section 34 and opens. The airbag 22 extends out from the opening lid 33 which has opened, and protects the passenger from the shock upon the vehicle collision. As described above, the ignition signal output by the collision determining circuit based on the signal from the acceleration sensor 30 is also transmitted to the inflator 60 inside the above-mentioned driver's seat airbag module 2 via the wire harness 5 and the spiral cable 9, thus expanding the airbag 61 in the same fashion and protecting the driver.

By installing the ECU 4 within the housing 23 of the passenger seat airbag module 1, it is possible to install the passenger seat airbag module 1 and the ECU 4 at the same time to the chassis of the vehicle. Furthermore, compared to the case of attaching to the steering unit 8, if the ECU 4 is installed together with the passenger seat airbag module 1 in the passenger seat dashboard 20, there is flexibility of installation space, thus designing freely the configuration of the ECU 4, the passenger seat airbag module 1 or the housing 23.

Because the housing 23 containing the ECU 4 with the accelerator sensor 30 is attached to the chassis of the vehicle as described above, the chassis deceleration (negative acceleration) generated by the vehicle collision is effectively transmitted to the above acceleration sensor 30, thus being capable of detecting the vehicle collision accurately.

Figure 3:
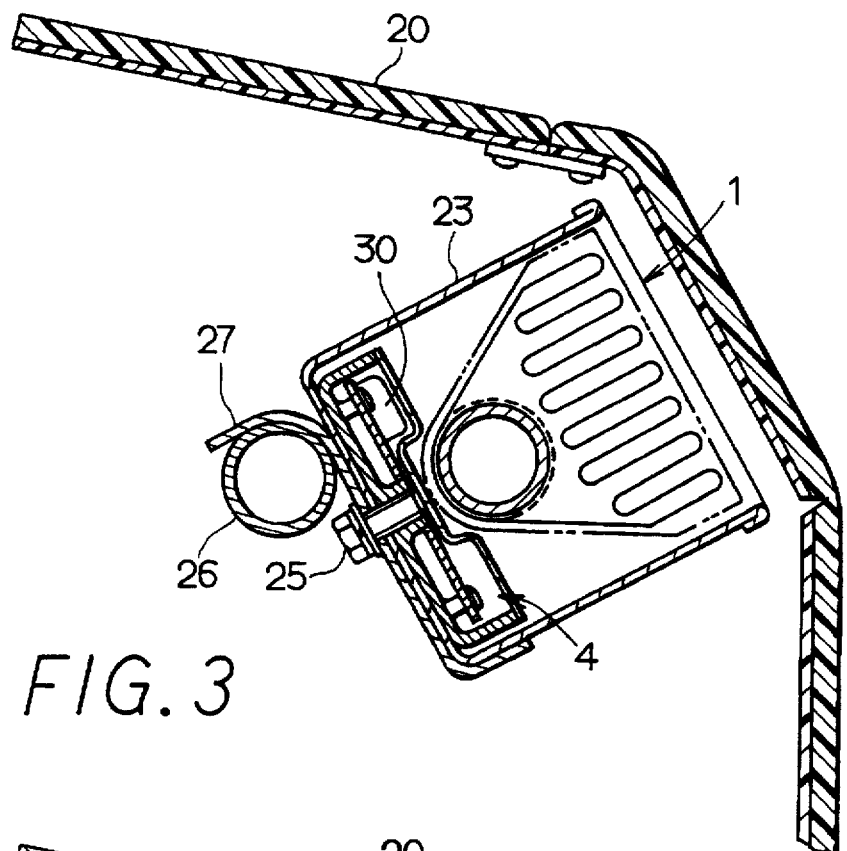
FIG. 3 is a cross section plan view showing the second embodiment of the invention.

Next follows a description, with reference to FIG. 3, of the second embodiment in which the passenger seat airbag module 1 and ECU 4 are formed as a single unit inside the passenger seat dashboard 20 of the vehicle. Descriptions are abbreviated when the structures or operational effects are the same as those described in the foregoing embodiment.

As shown in FIG. 3, in the second embodiment, the ECU 4 is housed in the housing 23 of the passenger seat airbag module 1. When mounting on the chassis of the vehicle, the housing 23 is directly attached to the attachment stay 27 instead of using the stay 24 as shown in FIG. 2.

In FIG. 3, the ECU 4 including the acceleration sensor 30 and collision determining circuit, etc. is attached with the bolt 25 to the attachment stay 27 together with the housing 23. The attachment stay 27 is welded to the dashboard reinforcement 26. The acceleration sensor 30 formed in the ECU 4 is installed near the dashboard reinforcement 26. As a result, the vehicle deceleration (negative acceleration) transmitted by the dashboard reinforcement 26 is more effectively transmitted to the acceleration sensor 30.

With the above structure it is possible to reduce the number of parts for the airbag device 100 by omitting the stay 24, thus reducing costs of the airbag device 100. Also, regarding the installation space of the stay 24, it is possible to realize space-saving within the passenger seat dashboard 20.

Figure 4:
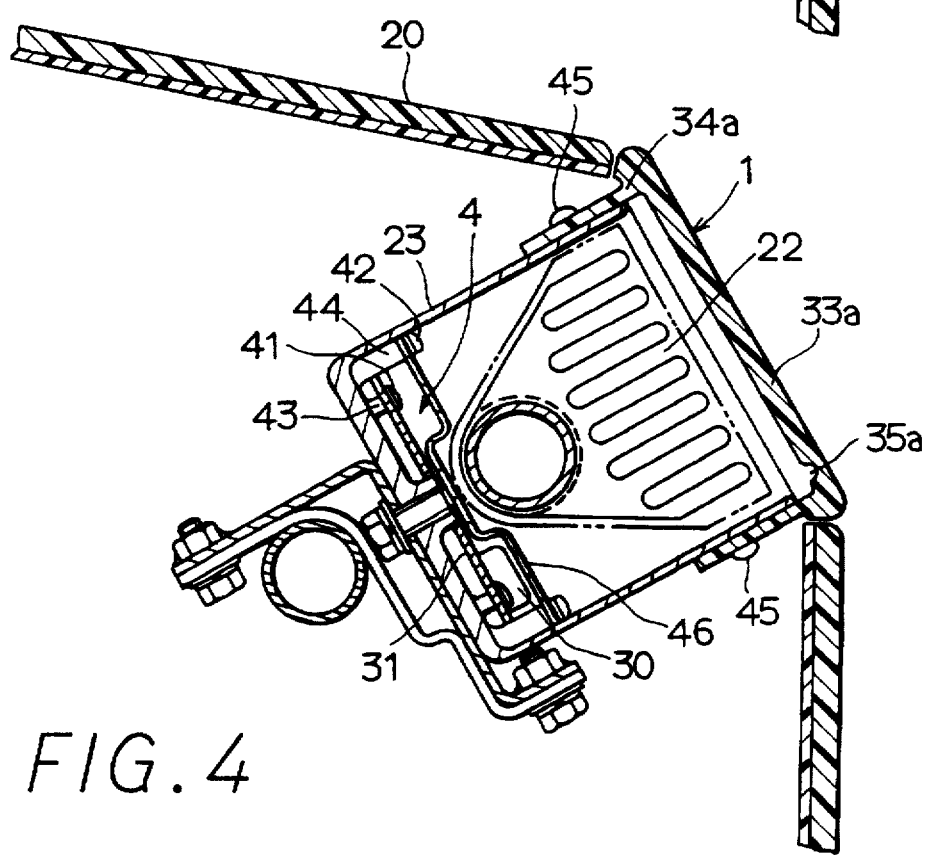
FIG. 4 is a cross section plan view showing the third embodiment of the invention.

Next follows a description, with reference to FIG. 4, of a third embodiment in which the passenger seat airbag module 1 and ECU 4 are formed as a single unit inside the passenger seat dashboard 20 of the vehicle. In the third embodiment an opening lid 33a is constructed as a part of the housing 23 for the passenger seat airbag module 1.

As shown in FIG. 4, the ECU 4 controlling operations of the passenger seat airbag module 1 and the driver's seat airbag module 2 is installed in the housing 23 of the passenger seat airbag module 1. The ECU 4 is formed on the PCB 31 fixed with screws 41 to multiple bases 43 formed on the housing 23. Then a protective plate 46 is secured to multiple bases 44 with screws 42 so that it covers the collision determining circuit formed on the PCB 31 and acceleration sensor 30, etc. from above.

A hinge 34a of the opening lid 33a is secured to the housing 23 with screws 45 or with a rivet. The opening lid 33a includes a lip line 35a so that, with expansion of the airbag 22, the lip line 35a breaks and the hinge 34a of the opening lid 33a bends, allowing the airbag 22 to extend toward the passenger seat.

By such a construction, it is possible to eliminate the case housing the ECU 4 and reduce the number of parts, thus also reducing the cost of the airbag device. And because the opening lid 33a is created as a part of the housing 23, it is possible to simultaneously carry out quality control of the attachment state of the opening lid 33a or the configuration of the lip line 35a following attachment of the passenger seat airbag module 1 and the ECU 4 to the housing 23, thus improving production efficiency for the airbag device 100.

This invention is not limited to the embodiments described above but can be changed in various ways as described below.

Figure 5:
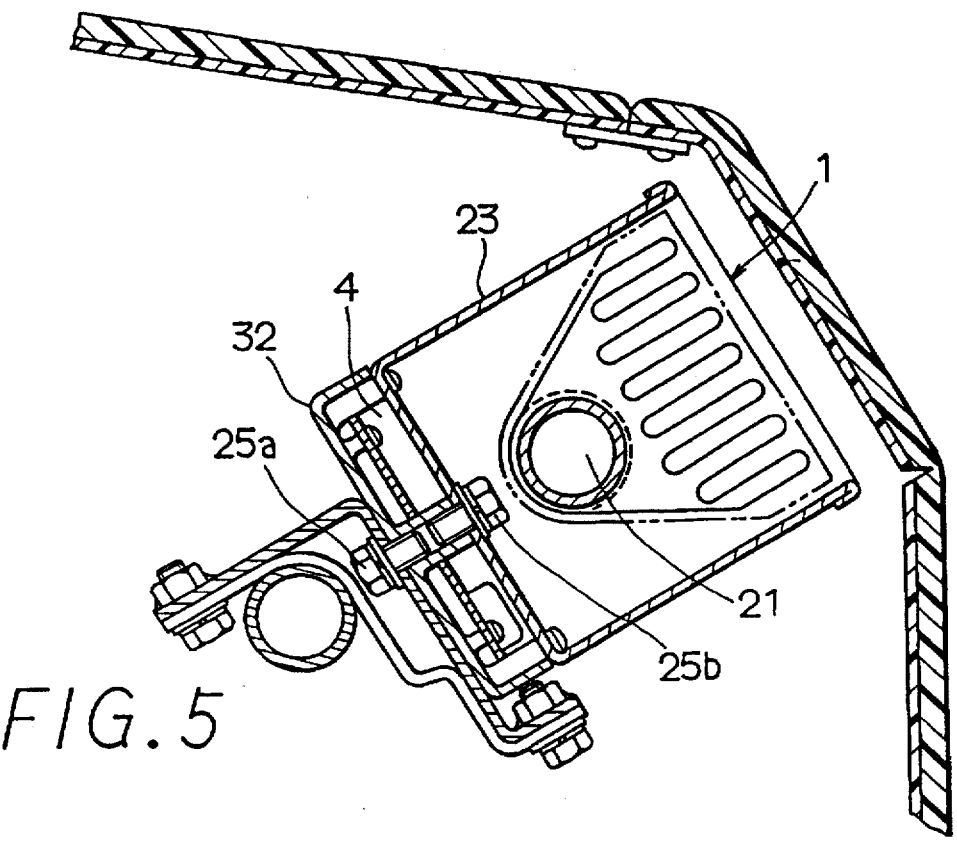
FIG. 5 is a cross section plan view showing the fourth embodiment of the invention.

For example, as shown in FIG. 5, it is also possible using screws 25a and 25b to secure the ECU 4 to the outside of the housing 23 inside the passenger seat dashboard 20. In such a case, the bottom of the housing 23 can work as a cover of the case 32 housing the ECU 4, thus reducing the number of parts. Also, when re-inserting the passenger seat airbag module 1 after generation of gas from the inflator 21 and expansion of the airbag 22 in case of the vehicle collision, it is possible to easily replace the passenger seat airbag module 1.

Figure 6:
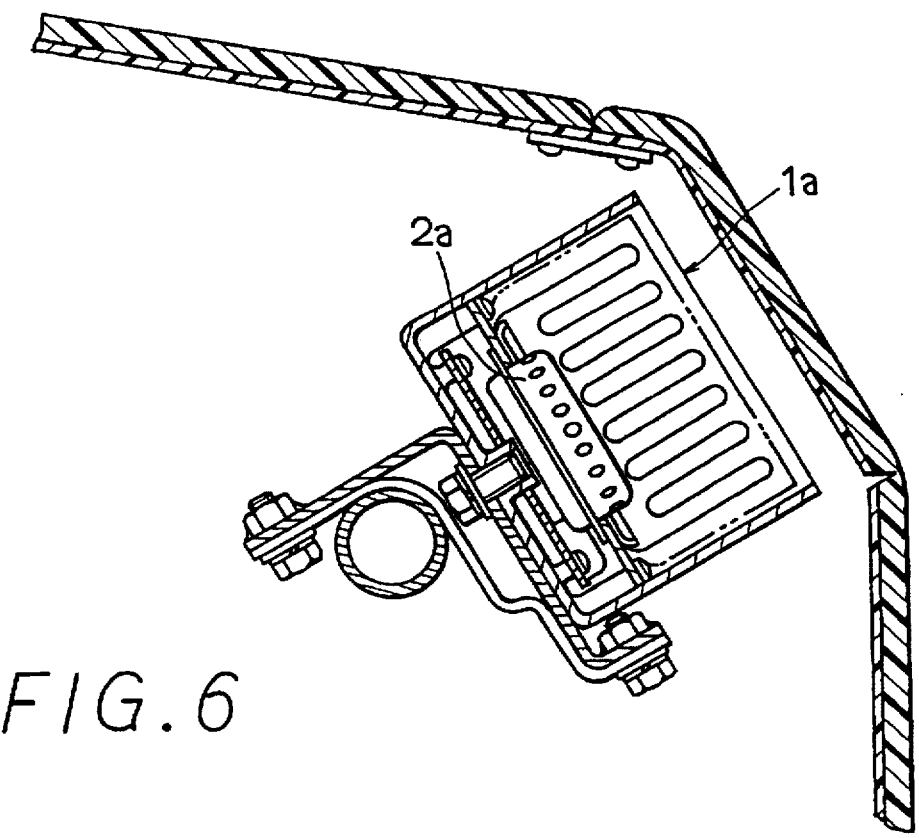
FIG. 6 is a cross section plan view showing the fifth embodiment of the invention.

As shown in FIG. 6, it is also possible to employ a disc-shaped inflator 2a even in the passenger seat airbag module 1. By using a disc-shaped inflator 2a in the passenger seat airbag module 1a it is possible to unify the specifications for the inflator 60 adopted for the driver's seat airbag module 2 and the inflator 2a adopted for the passenger seat airbag module 1a, thus reducing the cost of the airbag device.

What is claimed is:

1. An airbag device comprising:

an electronic control unit for determining a vehicle collision and outputting a detection signal in response to the vehicle collision;

a passenger seat airbag module including a first inflator for generating gas based on said detection signal from said electronic control unit, a first airbag inflated at a passenger seat side due to the gas from said first inflator and a first case for housing said first inflator and said first airbag;

a driver's seat airbag module including a second inflator for generating gas based on said detection signal from said electronic control unit, a second airbag inflated at a driver's seat side due to the gas from said second inflator and a second case for housing said second inflator and said second air bag;

at least one power source for supplying electrical power to said electronic control unit, and to said first and second inflators; and wiring for electrical connection of said electronic control unit and said first and second inflators, wherein said electronic control unit and said passenger seat airbag module are composed as a single unit.

2. An airbag device according to claim 1, wherein said electronic control unit is housed in a third case and said third case is secured inside said first case.

3. An airbag device according to claim 2, wherein both said first case and said third case are secured to a stay attached to a vehicle chassis frame inside a dashboard on said passenger seat side.

4. An airbag device according to claim 3, wherein said electronic control unit is housed in a third case, and after attaching said third case to the securing member inside the passenger seat side dashboard of said vehicle, the first case is secured to said third case.

5. An airbag device according to claim 2, wherein said first case is secured to a stay attached to a vehicle chassis frame inside a dashboard on said passenger seat side.

6. An airbag device according to claim 5, wherein a mounting stay for mounting said passenger seat airbag module to said stay is attached to said first case, and wherein, by securing said stay and said mounting stay, said passenger seat airbag module is attached inside said dashboard.

7. An airbag device according to claim 1, wherein said electronic control unit includes a board on which is arrayed a vehicle collision determining circuit to determine a vehicle collision, said board being attached inside said first case.

8. An airbag device according to claim 7, wherein said first case is secured to a stay attached to a vehicle chassis frame inside a dashboard on said passenger seat side.

9. An airbag device according to claim 8, wherein a mounting stay for mounting said passenger seat airbag module to said stay is attached to said first case, and wherein, by securing said stay and said mounting stay, said passenger seat airbag module is attached inside said dashboard.

10. An airbag device according to claim 1, wherein said electronic control unit is housed in a third case and said third case is secured outside said first case.

11. An airbag device according to claim 10, wherein a stay for attaching said first case is provided on a securing member, and wherein said first case is secured to said stay together with said third case.

12. An airbag device according to claim 10, wherein the third case is attached to the outside of said first case so that one part of said first case acts as a cover for said third case.

13. An airbag device according to claim 11, wherein a mounting stay for mounting said passenger seat airbag module in said vehicle is attached to said first case, and wherein, by securing of said stay and mounting stay, said passenger seat airbag module is attached inside a dashboard.

14. An airbag device according to claim 1, wherein said driver's seat airbag module is installed in a rotating steering unit, and an electrical connection between the rotating steering unit and a vehicle body is achieved by a connector including a flexible cable having multiple channels whereby said second inflator is electrically connected to said power source and said electrical control unit.

15. An airbag device according to claim 1, wherein said first and second inflators respectively included in said passenger seat airbag module and said driver's seat air bag module are disc-shaped.

16. An airbag device according to claim 1, further comprising:
a warning device for warning of an occurrence of an abnormality when said electronic control unit has failed.

17. An airbag comprising:
an electronic control unit for determining a vehicle collision and outputting a detection signal in response to the vehicle collision;

a passenger seat airbag module including a first inflator for generating gas based on said detection signal from said electronic control unit, a first airbag inflated at a passenger seat side due to the gas from said first inflator and a first case for housing said first inflator and first airbag;

a driver's seat airbag module including a second inflator for generating gas based on said detection signal from said electronic control unit, a second airbag inflated at a driver's seat side due to the gas from said second inflator and a second case for housing said second inflator and said second airbag;

at least one power source for supplying electric power to said electronic control unit, and to said first and second inflators; and wiring for electrical connection of said electronic control unit and said first and second inflators, wherein said electronic control unit is secured to said first case.

18. An airbag device according to claim 17, wherein said electronic control unit is housed in a third case and said third case is secured inside said first case.

19. An airbag device according to claim 17, wherein said electronic control unit includes a board on which is arrayed a vehicle collision determining circuit to determine a vehicle collision, said board being attached inside said first case.

20. An airbag device according to claim 17, wherein said electronic control unit is housed in a third case and said third case is secured outside said first case.

21. An airbag device according to claim 17, wherein said first case is secured to a stay attached to a vehicle chassis frame inside a dashboard on said passenger seat side.

22. An airbag device according to claim 20, wherein the third case is attached to the outside of said first case so that one part of said first case acts as a cover for said third case.

23. An airbag device according to claim 17, further comprising:
a warning device for warning of an occurrence of an abnormality when said electronic control unit has failed.

24. An airbag device comprising:
a power source;
a passenger seat airbag module including a first inflator for generating gas when receiving starting current from said power source, a first airbag inflated at a passenger seat side due to the gas from said first inflator and a first case for housing said first inflator and said first airbag;

a driver's seat airbag module including a second inflator for generating gas when receiving starting current from said power source, a second airbag inflated at a driver seat side due to the gas from said second inflator and a second case for housing said first inflator and said first airbag;

an acceleration sensor for detecting deceleration of a vehicle;

an electronic control unit for determining a vehicle collision based on said deceleration detected by said acceleration sensor and controlling supply of said starting current to said first and second inflators based on determination of said vehicle collision; and wire harnesses for connecting said power source with said electronic control unit, and said first and second inflators, wherein said acceleration sensor is installed in said electronic control unit, and said passenger seat airbag module and said electronic control unit are composed as a single unit.

* * * * *